J. M. Whitney.
Wheel Cultivator.
Nº 23,135.   Patented Mar. 1, 1859.
Fig: 1.
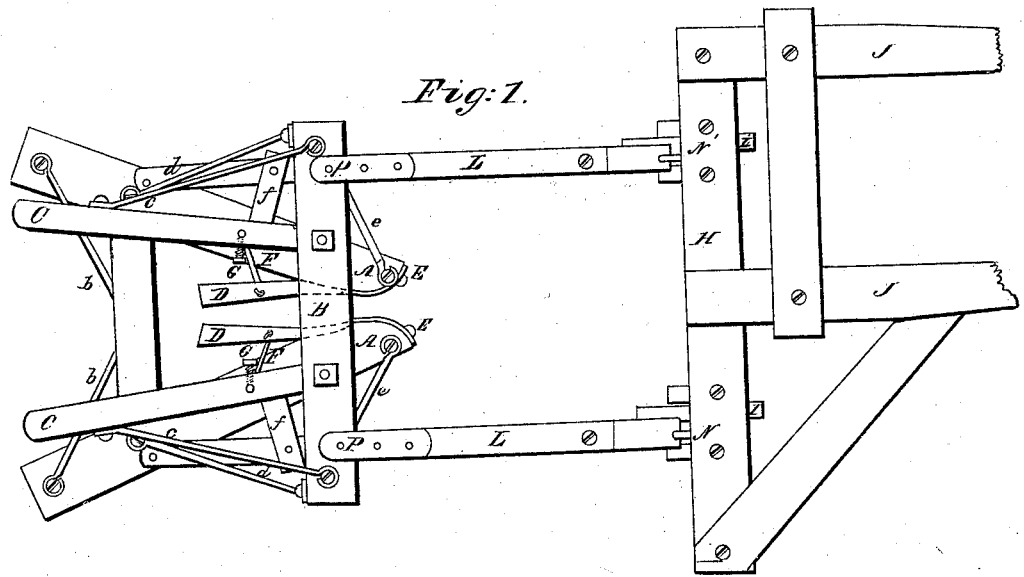
Fig: 2.
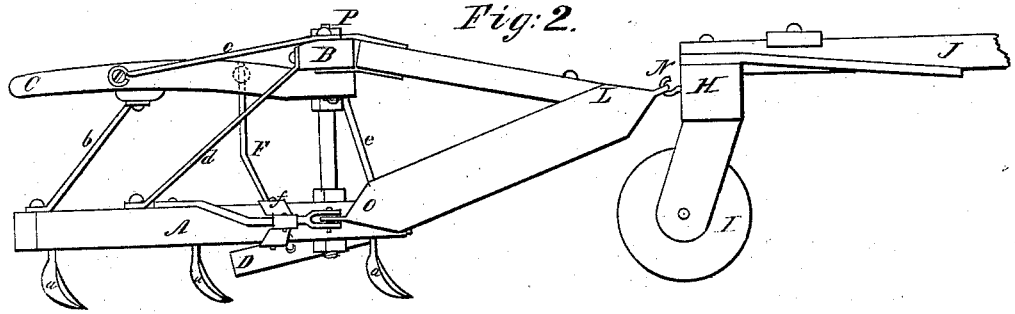

UNITED STATES PATENT OFFICE.

JOHN M. WHITNEY, OF BOLTON, MASSACHUSETTS.

IMPROVEMENT IN CULTIVATORS.

Specification forming part of Letters Patent No. 23,135, dated March 1, 1859.

*To all whom it may concern:*

Be it known that I, JOHN M. WHITNEY, of Bolton, county of Worcester, in the State of Massachusetts, have invented certain new and useful Improvements in Cultivators; and I do hereby declare that the following is a full and exact description thereof, reference being had to the accompanying drawings, and to the letters of reference marked thereon.

The nature of my invention consists in a novel arrangement of the same parts, as hereinafter fully described.

To enable those skilled to make and use my invention, I will proceed to describe its construction and operation, referring by letters to the accompanying drawings, forming part of this specification, and in which—

Figure 1 represents a top view of my improved horse hoe or cultivator, and Fig. 2 a side elevation of the same, similar letters denoting the same parts in the several views.

A are the lower frame-pieces, which are so arranged relatively as to carry in the proper oblique direction the teeth *a*, and allow at the same time the stalks to be cultivated to pass freely between them. Said frame-pieces A are suitably connected to an upper cross-beam, B, from which extends backward the handles C, and have pivoted to their under sides at E the adjustable mold-boards D. Said mold-boards are set and retained at any desired angle by means of adjusting-rods F, secured by set-screws G.

To the cross-beam B at P and to the lower frame, A, at O are pivoted the rear upper and lower ends of a connecting-frame, L, in such manner as to render said frame capable of swiveling laterally upon said cross-beam B and frame A. Said connecting and swiveling frame L is coupled at N by swivel-joints to a light frame, H, in such manner as to allow said frame H to turn in any direction. To this frame H are connected in the usual manner the thills J, to which the team is harnessed. The thills J are placed to one side of the center of the apparatus in order that the horse may travel one side of the row of stalks to be cultivated. The thills J, by being attached to the frame H, which is swiveled to the cultivator-frames A B by means of the connecting-frame L, as already described, allows the horse also to travel unevenly, while the cultivator-frame A B may be kept by the operator always at right angles to the frame H and in the proper course.

It will be seen that by the arrangement of the several parts, as already described, the rows of stalks may be perfectly cultivated without being broken down, the frame A B passing on either side of the row, as does also the horse, as already mentioned. The mold-boards D may be adjusted to throw up the earth to any required degree.

Having fully described the construction and operation of my improved horse hoe or cultivator, what I claim therein as new, and desire to secure by Letters Patent, is—

The arrangement of the teeth *a*, adjustable mold-boards D, frames A A', and cross-beam B, with the branched swivel-bars L and frame H, the whole being constructed as and for the purpose herein described.

In testimony whereof I have hereunto set my hand and seal this 11th day of February, 1859.

JOHN M. WHITNEY. [L. S.]

Witnesses:
J. N. McINTIRE,
HENRY W. TURPIN.